(12) United States Patent
Niezrecki et al.

(10) Patent No.: US 6,845,062 B2
(45) Date of Patent: Jan. 18, 2005

(54) MANATEE WARNING SYSTEM

(75) Inventors: Christopher Niezrecki, Gainesville, FL (US); Richard Lee Phillips, Gainesville, FL (US); Michael Meyer, Orlando, FL (US); Deidrich Beusse, Gainesville, FL (US)

(73) Assignee: University of Florida Reasearch Foundation, Inc., Gainesville, FL (US)

( * ) Notice: Subject to any disclaimer, the term of this patent is extended or adjusted under 35 U.S.C. 154(b) by 0 days.

(21) Appl. No.: 10/684,623

(22) Filed: Oct. 14, 2003

(65) Prior Publication Data

US 2004/0076080 A1 Apr. 22, 2004

Related U.S. Application Data

(60) Provisional application No. 60/418,466, filed on Oct. 14, 2002.

(51) Int. Cl.$^7$ .............................. H04B 1/02; H04B 11/00
(52) U.S. Cl. ........................ 367/131; 367/135; 367/139
(58) Field of Search ................................. 367/131, 139, 367/135, 136; 116/22 A; 340/566, 565, 573.2

(56) References Cited

U.S. PATENT DOCUMENTS

| | | | | | |
|---|---|---|---|---|---|
| 4,922,468 | A | * | 5/1990 | Menezes | 367/139 |
| 5,168,473 | A | * | 12/1992 | Parra | 367/124 |
| 5,377,163 | A | * | 12/1994 | Simpson | 367/131 |
| 5,559,759 | A | * | 9/1996 | Gerstein et al. | 367/139 |
| 5,563,849 | A | * | 10/1996 | Hall et al. | 367/127 |
| 5,850,372 | A | * | 12/1998 | Blue | 367/139 |
| 2003/0151514 | A1 | * | 8/2003 | Sargent | 340/573.2 |

* cited by examiner

Primary Examiner—Ian J. Lobo
(74) Attorney, Agent, or Firm—Akerman Senterfitt

(57) ABSTRACT

A system (100) and method for identifying a presence of a creature (140) disposed in water (135). This system includes a transducer (105) for receiving at least one vibrational wave and generating at least one transformed signal responsive to the vibrational wave. The system also includes a signal processor (110) for processing the transformed signal to indicate a presence of a particular type of creature which is disposed in water. The system can be included with a buoy, a mooring, an underwater structure and/or a watercraft.

20 Claims, 11 Drawing Sheets

MANATEE WARNING SYSTEM

CROSS-REFERENCE TO RELATED APPLICATIONS

The present application claims the priority of provisional U.S. patent application No. 60/418,466 entitled Manatee Warning System, filed Oct. 14, 2002.

STATEMENT REGARDING FEDERALLY SPONSORED RESEARCH OR DEVELOPMENT (Not applicable)

BACKGROUND OF THE INVENTION

1. Field of the Invention

The present invention relates to the field of acoustic detection, and more particularly, to the field of underwater acoustic detection.

2. Description of the Related Art

The popularity of pleasure boating craft has adversely affected manatee populations in the southeastern United States. Manatees, which are slow moving, docile mammals, populate busy southeastern waterways and are frequently struck by speeding boats, oftentimes being severely injured or killed. As a result, manatee populations have declined substantially to the point where they are now an endangered species.

Boating regulations have been implemented to reduce the incidence of manatees being struck by boats. In particular, "Manatee Safe Idle Speed Zones" have been established in areas where manatees are known to frequent. In such zones, boaters are limited to traveling slowly at idle speed, thus giving the manatees more time to move from the path of oncoming boats after the manatees detect their presence. Safe idle speed zones are viewed as a nuisance by boaters, however. In particular, it can take a boat traveling at idle speed a significant amount of time to travel from one point to another. Further, recreational boating activities, such as water skiing, wakeboarding, tubing, etc., have been curtailed due to the speed limitations in these zones.

SUMMARY OF THE INVENTION

The present invention relates to a system and method for identifying a presence of a creature disposed in water. This system includes a transducer for receiving at least one vibrational wave and generating at least one transformed signal responsive to the vibrational wave. The system also can include a signal processor for processing the transformed signal to indicate a presence of a particular type of creature which is disposed in water. The system can be included with a buoy, a mooring, an underwater structure and/or a watercraft.

The system can include an indicator which communicates a warning signal responsive to a detection of the creature. For example, a visual indicator, an audio transducer or a mechanical vibration device can be provided. Moreover, a mechanical device operatively connected to a control system of a watercraft can be provided.

The signal processor can detect the harmonic frequency content of the signal, measure the amplitude of the harmonic frequency and/or detect a maximum harmonic frequency. Further, the signal processor can track the number of creature detection occurrences and the number of false creature identification occurrences. Additionally, the system can include a snap rejection module which rejects vibrational waves having a duration less than a predetermined value. For example, the vibrational wave can be a sound created by a vocalization, a translational movement in water, a slapping of water and/or a clicking.

The method for identifying a presence of a creature disposed in water can include the step of receiving at least one vibrational wave and generating at least one transformed signal responsive to the vibrational wave which indicates a presence of a particular type of creature which is disposed in water. The vibrational wave can be a sound created by a vocalization, a translational movement in water, a slapping of water, and/or a clicking. The transformed signal can be processed to indicate when a particular creature is detected.

The processing step can further include the step of detecting a harmonic frequency content of the signal, an amplitude of at least one harmonic frequency contained in the signal, and/or a maximum harmonic frequency contained in the signal. Signals associated with vibrational waves having a duration less than a predetermined value can be rejected.

The method can further include the step of communicating at least one warning signal responsive to a detection of the creature. For example, the warning signal can be a visual indicator, an audio signal, or a vibrational signal. The method also can include the step of automatically controlling at least one operational parameter of a watercraft responsive to a detection of the creature. Further, the number of creature detection and false creature detection occurrences can be measured.

DETAILED DESCRIPTION OF THE INVENTION

An embodiment in accordance with the present invention relates to a warning system that can determine whether certain creatures disposed in water are present in nearby waterways. For example, the warning system can detect the presence of manatees, dugongs, dolphins, whales, alligators, crocodiles, scuba divers, or any other creature which generates identifiable vibrational waves. The warning system can represent a cost-effective method for signaling to watercraft operators when the specified creatures are present in the vicinity of the watercraft. Accordingly, watercraft operators can slow to idle speed and maintain a lookout for the creatures until the watercraft is clear of the affected area.

The warning system can be configured to monitor for vibrational waves generated by the creatures and provide an indication when such vibrational waves are detected. Notably, creatures disposed in water can generate identifiable vibrational wave patterns. These wave patterns can be caused by vocalizations, translational movement in water, slapping or clicking noises, or any other vibrational wave that can be associated with the presence of a creature. Such wave patterns can have identifiable frequencies, amplitudes, harmonics, repetition rates or other distinguishing characteristics. Hence, the warning system can be easily adapted to warn of a number of different types of creatures disposed in water.

The warning system can detect the vibrational waves using a transducer which can generate signals correlating to the vibrational waves. Signal processing techniques can be applied to the signals to identify signal characteristics which indicate the presence of the creatures. Background noises, such as watercraft noise, snapping shrimp, or any other type of background noises, can be filtered from the signals.

Figure 1:
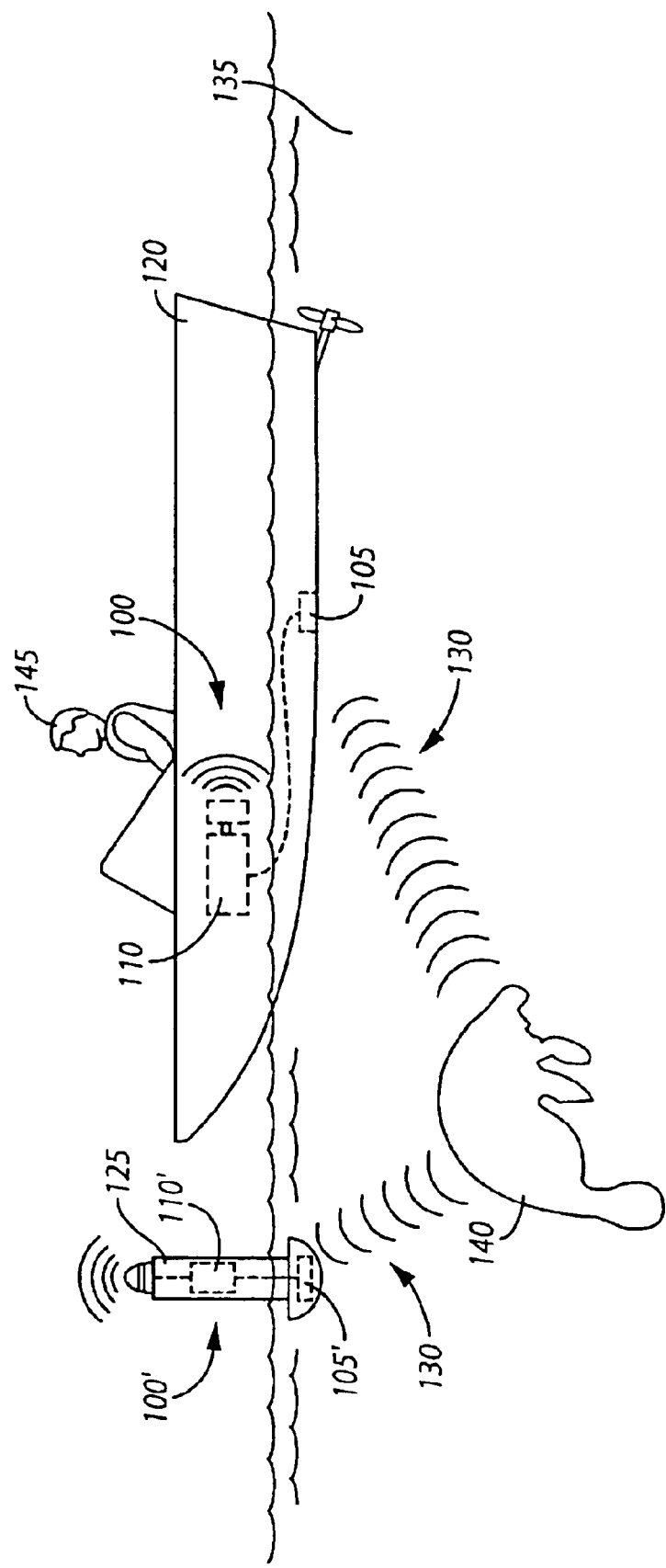
FIG. 1 is a schematic diagram of an exemplary warning system for creature detection in accordance with the present invention.

Referring to FIG. 1, embodiments of an exemplary warning system 100, 100' are presented. The warning system 100 can be included with an aquatic device, for example a boat 120 or buoy 125. The warning system also can be included with any other type of watercraft, such as ship, a personal watercraft, an underwater craft, and so on. Further, the warning system 100 can be included with a mooring or an underwater structure.

The warning system 100 can comprise a transducer 105, for example a hydrophone, a microphone or piezoelectric transducer, a data acquisition and processing system 110, and signal processing software. In operation, the warning system 100 can monitor and detect vibrational waves 130, for example acoustic signals in a body of water 135. When a vibrational wave is received which is indicative of a selected type of creature 140 disposed in water 135, such as a manatee, a warning can be triggered to alert a watercraft operator 145 that a creature 140 is in the vicinity. The warning can be in the form of an audible signal, a visual signal, a vibrational indicator, or any other device or method for warning the operator that a manatee is in the vicinity.

For example, in the embodiment where the warning system 100 is included in a watercraft, such as the boat 120, the warning system 100 can generate an audible sound detectable by the boat operator 145 when one or more creatures 140 are detected. In another arrangement, a device worn by the operator 145 can begin vibrating upon detection of the creature 140. In yet another arrangement, the warning system 100 can be integrated into the operational controls of a watercraft. The warning system 100 can automatically slow the engine to idle speed when the creature 140 is detected. Still, there are a myriad of techniques known to skilled artisans which can be used as an alert to a watercraft operator, and such techniques are within the intended scope of the present invention.

In the embodiment that the warning system 100' is incorporated into the buoy 125, the buoy 125 can alert watercraft operators when one or more creatures 140 are in the vicinity of the buoy 125. For example, the buoy 125 can flash a light to alert a watercraft operator 145 that one or more creatures 140 are present. The buoy 125 also can generate an audible signal, for example with a horn. Again, these types of alerts are provided merely as examples and the invention is not so limited.

There are a number of different methods of vibrational wave detection that can be used to detect a particular type of creature 140. Three potential methods are discussed herein, but it will be understood by those skilled in the art that further techniques can be used to identify specific types of vibrational waves and such methods are within the intended scope of the present invention.

Method 1

Figure 2:
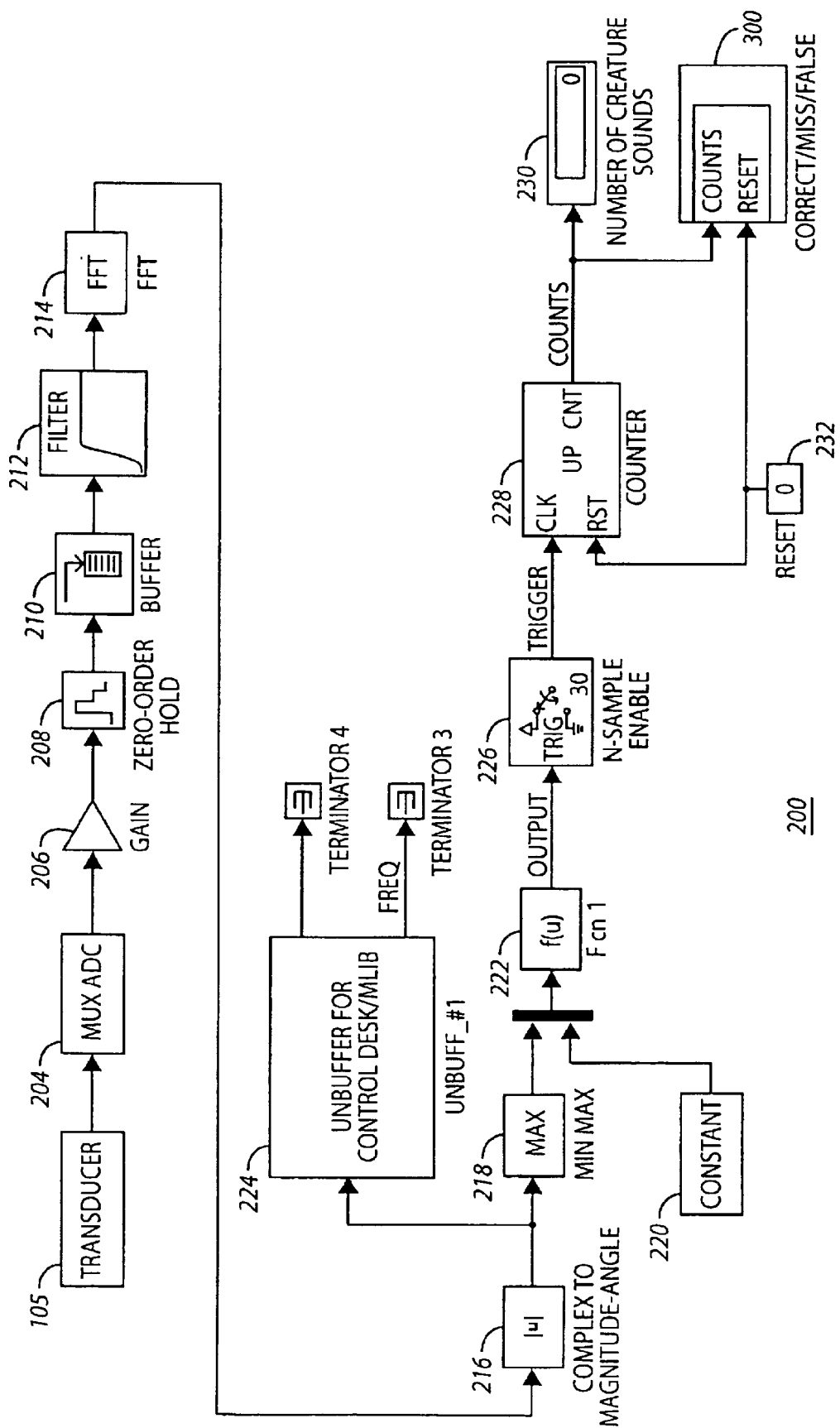
FIG. 2 is a schematic diagram of an exemplary data acquisition and processing system in accordance with the present invention.

FIG. 2 depicts a block diagram of an exemplary data acquisition and processing system (system) 200 that can be used to identify a vibrational wave which is indicative of the presence of one or more specific types of creatures. The system 200 can be realized in hardware, software, or a combination of hardware and software. For example, the system 200 can include one or more processors which execute program code and process data. Such a processor can be a central processing unit (CPU), a digital signal processor (DSP), an application specific integrated circuit (ASIC) or any other suitable processor.

The system 200 can receive signals from the transducer 105 and generate a correlating signal, for example an analog signal. The system 200 also can include an analog-to-digital (A/D) converter 204. The A/D converter 204 can receive the analog signal from the transducer 105 and convert the signal to digital format. The signal can then be amplified by amplifier 206, sampled by digital sampler 208, and stored into a buffer 210. For example, the digital sampling rate can be 44.1 kHz and the buffer length can be 512 bytes. The signal then can be filtered by a filter 212. In one arrangement, the digital filter can be a bandpass filter which passes signals in a desired frequency range and rejects signals outside the desired frequency range. For example, the filter can be a $4^{th}$ order Butterworth digital bandpass filter which passes signals in the frequency range between 1 kHz and 11 kHz. The invention is not so limited, however, and filters having any of a myriad of filter topographies can be used. Notably, underwater signals between 1 kHz and 11 kHz and having specific amplitudes can be associated with manatees.

The signal then can be processed by a Fast Fourier Transform (FFT) processor 214 to generate FFT data from the signal so that the frequency content of the signal can be analyzed. A processor 216 can be provided to represent the complex numbers of the FFT data with signal magnitudes and phase angles. An unbuffer 224 can be used to unbuffer the FFT data so that it can be displayed as an Amplitude vs. Frequency plot on a display unit. Simultaneously, the maximum value (amplitude) of the FFT data then can be determined by a maximum detector 218 and compared to a constant 220, which can be set by a user. If the maximum value of the FFT is greater than or equal to the constant, comparator 222 can generate a detection signal.

An N-sample enable trigger 226 can be used to trigger an alarm, for example an indicator, to alert that a specified creature is present in the water. The indicator can stay activated for a period of time. For example, if the warning system is installed on a buoy, the indicator can remain activated while the specified creatures are within a predetermined range of the buoy. If the warning system is installed on a watercraft and the indicator is a flashing light, the indicator can remain activated while the specified creatures are within a predetermined range of the watercraft. If the warning system is installed on a watercraft and the indicator is an audible signal, the indicator can provide a first audible signal when a specified creature is detected within a predetermined range of the watercraft and a second audible signal when the specified creature is no longer in the range of the watercraft.

Counter 228 can be used to count the number of signals received that are indicative of a presence of the specified creature. The count can be displayed in a register 230. Reset switch 232 can be activated by a user to reset the counter 228 and set the register 230 to zero. Further, the number of correct identifications and false identifications can be tracked with an error tracking system 300, which is shown in greater detail in FIG. 3. For example, the number of false counts received can be tracked, for instance the number of times a manatee is detected yet no manatees are present. False negatives also can be tracked, for instance when there are manatees present but none detected. Lastly, false negative-shadows can be tracked, for instance, when a first sound is overshadowed by a second sound.

Figure 3:
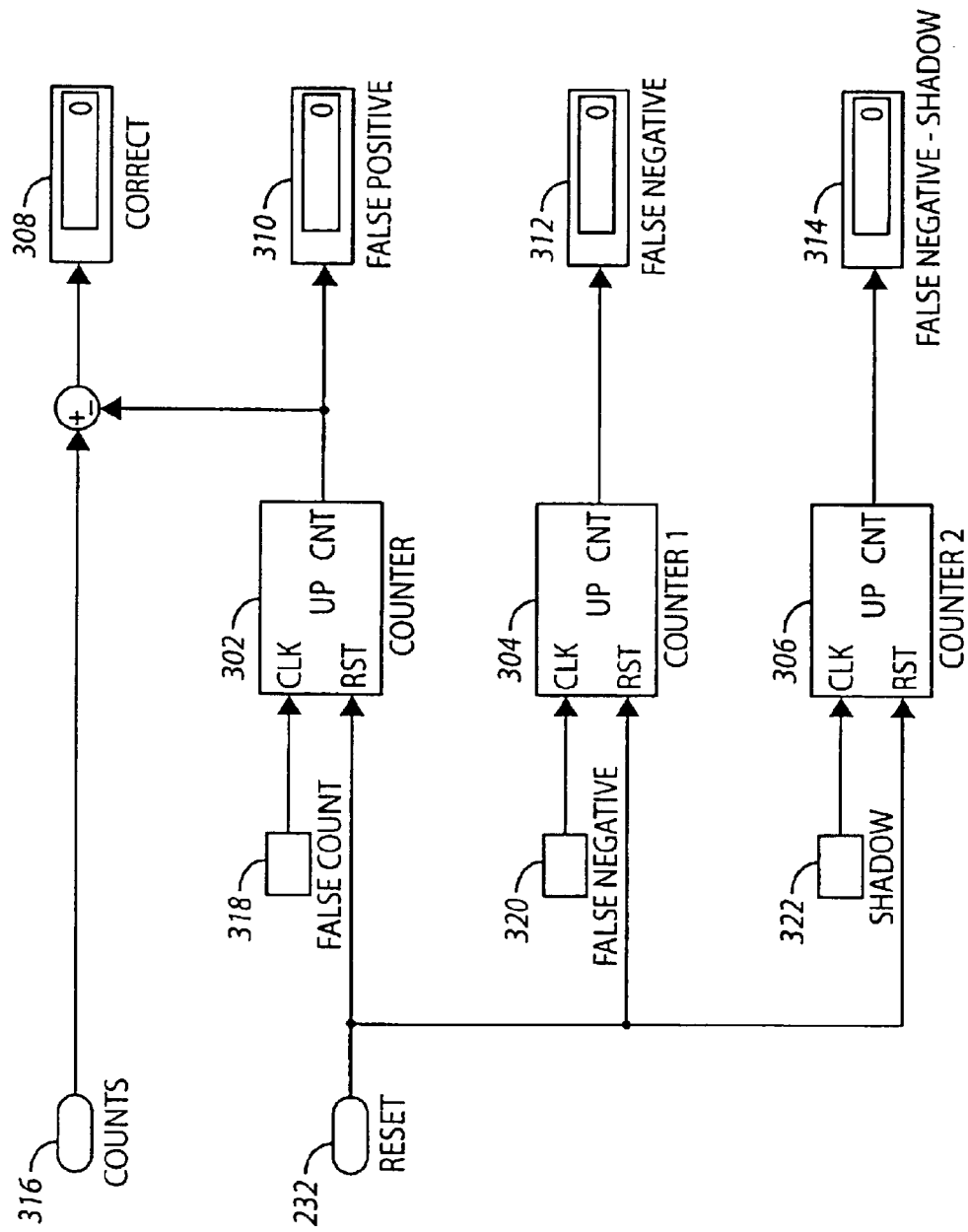
FIG. 3 is a schematic diagram of an exemplary error tracking system in accordance with the present invention.

Referring to FIG. 3, counters 302, 304, 306 can be used to measure false counts, false negatives and false negative-shadows, respectively. Further, correct count register 308, false positive register 310, false negative register 312, and false negative-shadow register 314 can be used to display the correct, false positive, false negative and false negative-shadow data, respectively. Each time a count 316 is received, the count value displayed in correct count register 308 can be incremented. When a false count switch 318 is manually activated by a user, the value displayed in the false positive register 310 can be incremented by one and the value displayed in the correct count register can be decremented by one. Further, a user can manually activate false negative switch 320 or false negative-shadow switch 322 to indicate a presence of a creature that was not detected by the warning system and increment the respective false negative register 312 and false negative-shadow register 314. Reset 232 can be triggered to reset the counters 302, 304, 306 and set the registers 310, 312 and 314 to zero.

Method 2

Figure 4:
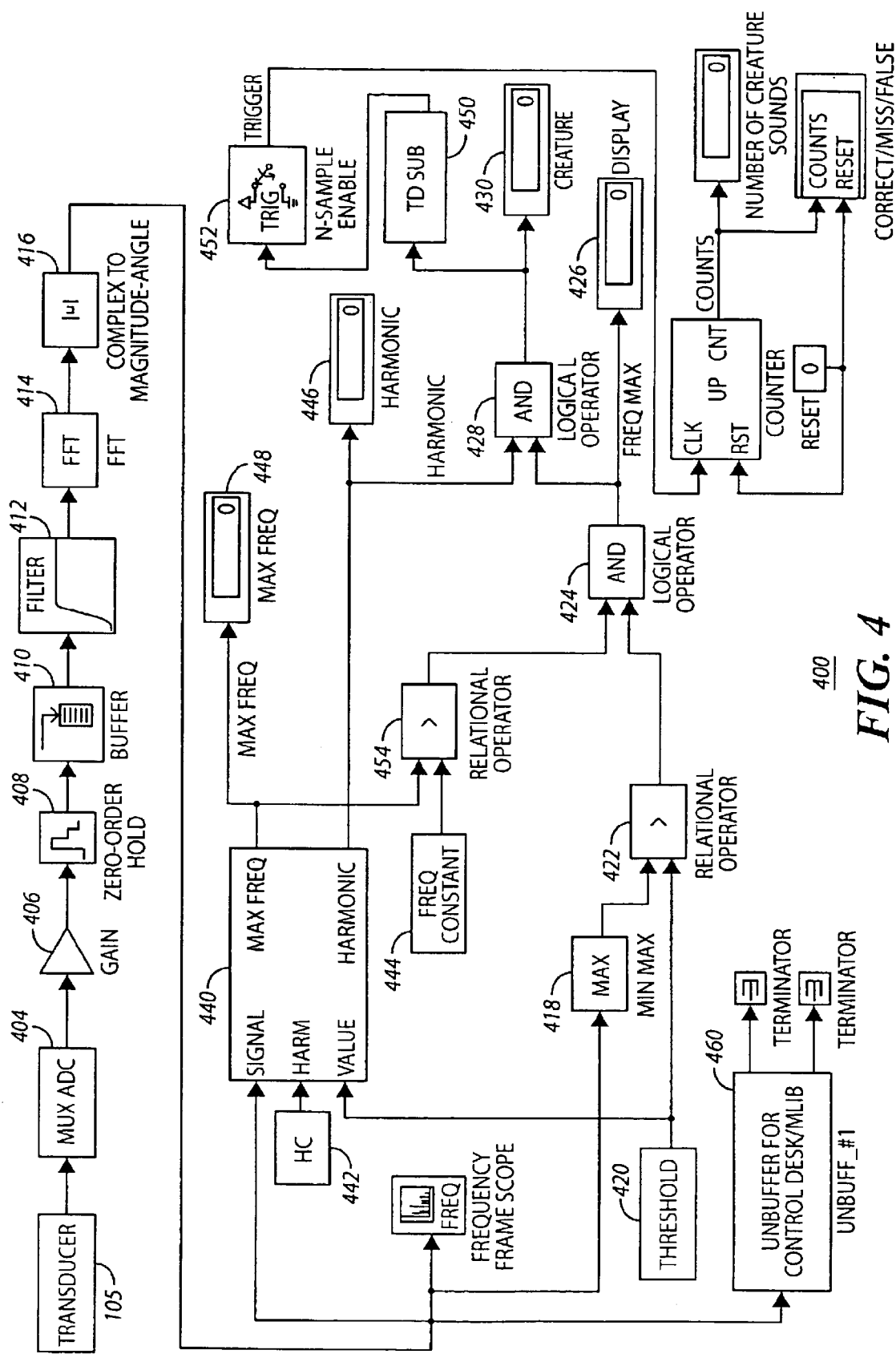
FIG. 4 is a schematic diagram of another exemplary data acquisition and processing system in accordance with the present invention.

FIG. 4 depicts a block diagram of another exemplary data acquisition and processing system (system) 400 that can be used to identify a vibrational wave which is indicative of the presence of one or more specific types of creatures. As with the system 200, the system 400 can be realized in hardware, software, or a combination of hardware and software. For example, the system 400 can include one or more processors which execute program code and process data. Such a processor can be a central processing unit (CPU), a digital signal processor (DSP), an application specific integrated circuit (ASIC) or any other suitable processor.

The system 400 can include an analog-to-digital (A/D) converter 404 which can receive an analog signal from the transducer 105. The signal can then be amplified by amplifier 406, sampled by digital sampler 408, and stored into a buffer 410. The signal then can be filtered by a filter 412 and processed by a Fast Fourier Transform (FFT) processor 414 to generate FFT data from the signal so that the frequency content of the signal can be analyzed. A processor 416 can be provided to represent the complex numbers of the FFT data with signal magnitudes and phase angles.

The maximum value (amplitude) of the FFT data (maximum-detected) then can be determined by a maximum detector 418 and compared to a constant threshold value 420, which can be set by the user. If the maximum value of the FFT is greater than or equal to the constant threshold value 420, a relational operator 422 can forward the maximum-detected signal to a logical operator 424, for example an AND gate.

Figure 5:
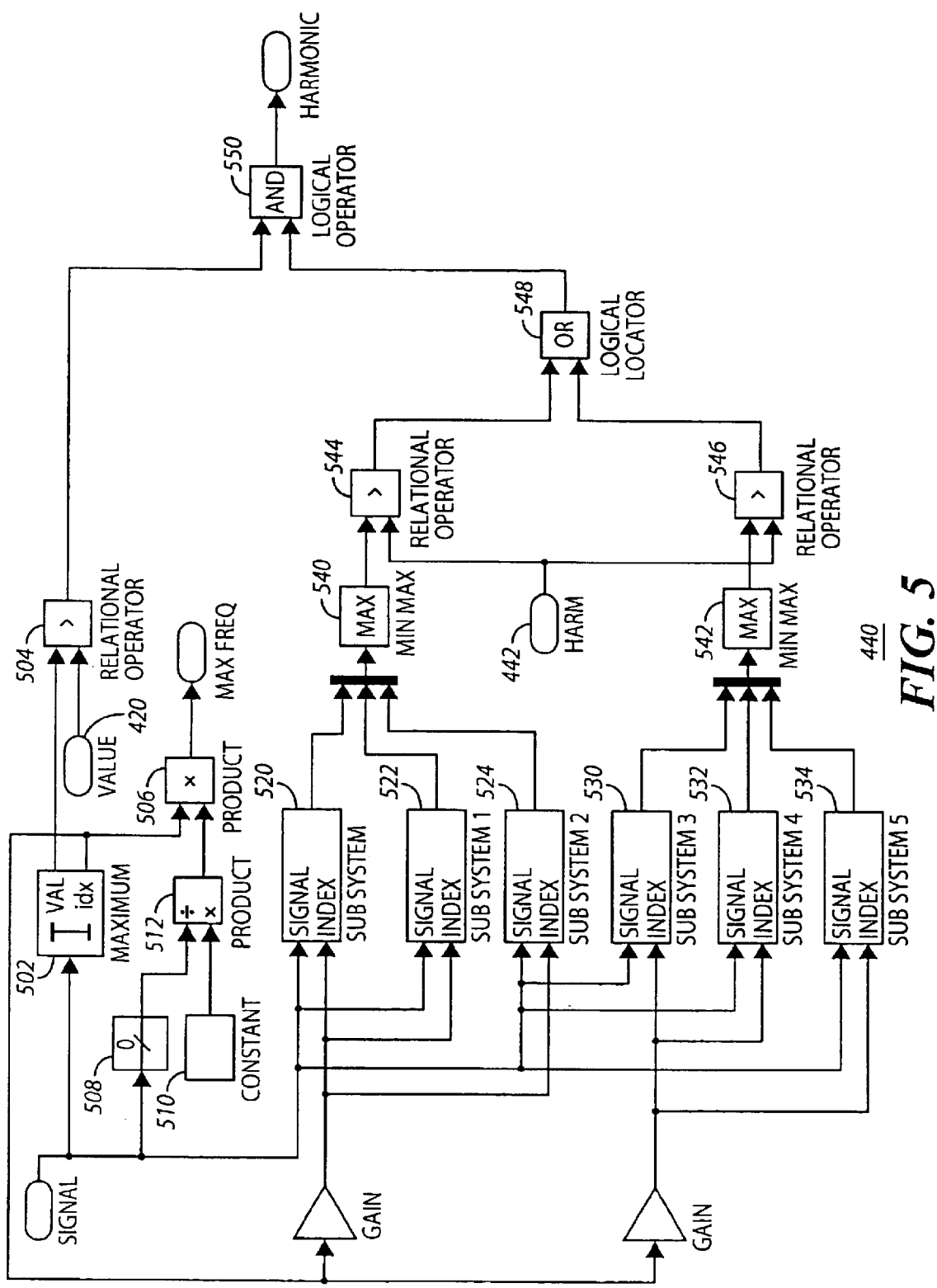
FIG. 5 is a schematic diagram of an exemplary maximum frequency subsystem in accordance with the present invention.

A maximum frequency subsystem 440 can be used to determine the frequency of the maximum value of the FFT, as well as determine if there are any harmonics present in the signal. This subsystem is shown in FIG. 5 and further discussed below. The maximum frequency subsystem 440 can receive the FFT data from the complex number processor 416, a harmonic constant 442 and the threshold value 420, and output both a harmonic detected signal (harmonic-detected) as well as the frequency of the maximum value of the FFT (frequency-detected). The harmonic detected signal can be displayed in register 446 and the frequency of the maximum value of the FFT can be displayed in register 448.

The frequency output from the maximum frequency subsystem 440 can be compared by a relational operator 454 to a frequency constant 444, ensuring that the frequency output from the maximum frequency subsystem 440 exceeds the frequency constant 444. If frequency output does exceed the frequency constant 444, a frequency-detected signal can be produced. The frequency-detected signal and maximum-detected signal can be combined with the logical operation 424, and the resulting freq/max signal can be displayed in register 426. The freq/max and harmonic-detected signals also can be combined in a logic gate 428, for example an AND gate. If frequency, amplitude and harmonic criteria of the signal are acceptable, a creature-detected signal can be produced and forwarded to a register 430.

Figure 6:
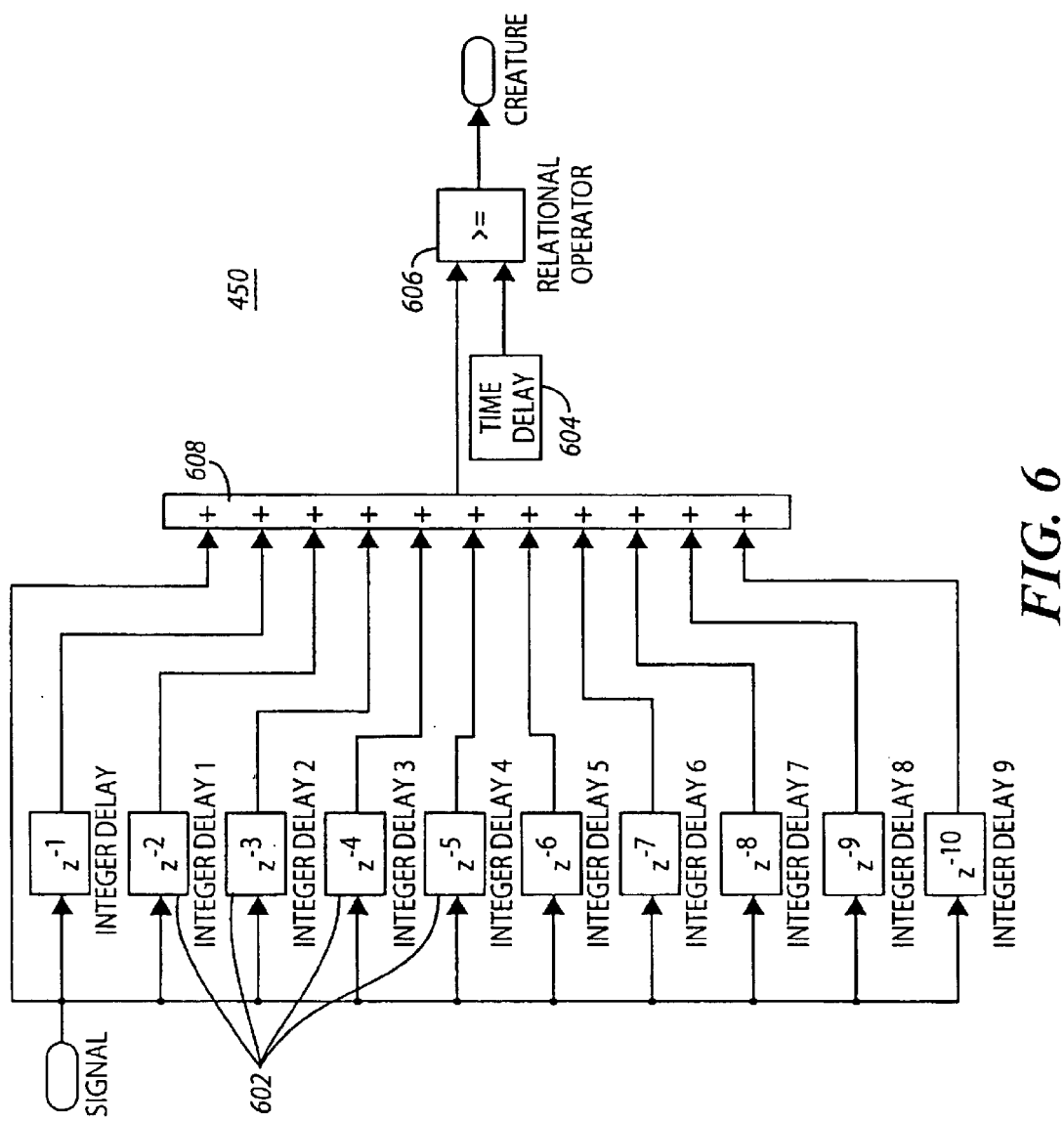
FIG. 6 is a schematic diagram of an exemplary time delay subsystem in accordance with the present invention.

A time delay subsystem 450 can be used to eliminate any sounds that do not exceed a specified time length. An exemplary time delay subsystem 450 is depicted in FIG. 6 and is further discussed below. An N-sample enable trigger 452 can be used to trigger an alarm, for example an indicator, to alert that a specified creature has been detected. The indicator can stay activated for a period of time. Further, unbuffer 460 can be used to unbuffer the FFT data so that it can be displayed as an Amplitude vs. Frequency plot on a display unit. Finally, the count, false count, false negative and false negative-shadow method and system of FIG. 3, as described in method 1, can be used to count the manatee calls detected.

Referring to FIG. 5, an exemplary maximum frequency subsystem 440 for determining the frequency of the maximum value of the FFT is shown. In operation, a detector 502 can detect a maximum value of an incoming signal and an FFT index which correlates to the maximum value. The maximum value can be forwarded to a relational operator 504 and compared to the threshold value 420. If the maximum value is greater than the threshold value 420, the maximum value can be forwarded to a logical operator 550, for example, an AND gate. A multiplier 506 can be provided to multiply the correlating FFT index by a quotient ($\Delta f$) of a sample time 510 divided by the buffer length 508 (e.g. 512 bytes). The quotient can be attained using divider 512. The product of the FFT index and $\Delta f$ is typically the frequency at which the maximum amplitude occurs.

The next two harmonic frequencies of the frequency with maximum amplitude are then determined and the corresponding amplitudes are also determined. FFT index values correlating to the harmonics 520, 530 of the maximum frequency are then evaluated along with the index values 522, 532 (respectively) immediately before and index values 524, 534 (respectively) immediately after each harmonic. The index values before and after the harmonic are evaluated in case the peak amplitude of the harmonic signal does not fall exactly at the harmonic frequency. The largest (amplitude) of each set of the three index values then can be compared to a set constant. If either the largest of the three index values exceeds the constant value, a harmonic-detected signal can be output. For example, the maximum frequency subsystem 440 can include a max detector 540, 542 to evaluate each set of three index values to determine the index value in each set with the greatest amplitude. Relational operators 544, 546 can determine if the two indexes selected by max detectors 540, 542 have an amplitude greater than the harmonic 442. If either exceeds the harmonic constant 442 a harmonic-detected signal can be output via logical operator 548, such as an OR gate, to the logical operator 550, where the harmonic detected-signal can be output.

Referring to FIG. 6, an exemplary time delay subsystem 450 is depicted. The time delay subsystem can comprise a plurality of delay processors 602, a summing block 608, a time delay constant 604 which can be established by a user, and a relational operator 606. In the time delay system, an input signal can be forwarded to each of the plurality of delay processors 602. Each delay processor 602 can be used to pass a portion of a detected signal, each portion correlating to a discrete time. For example, a first delay processor can pass the detected signal for a first period of time, the second delay processor can pass the detected signal for a second period of time, and so on. For each delay processor, an output signal can be forwarded to the summing block 608. A resulting signal generated by the summing block which represents the total delay of the signal can be forwarded to the relational operator 606 and compared against the delay constant 604. If the total delay is indicative of a creature detection, for example having a logical state of 1, then the logical state representing a creature detection can be output into the main system, for example to the N-sample enable trigger 452.

Method 3

Figure 7:
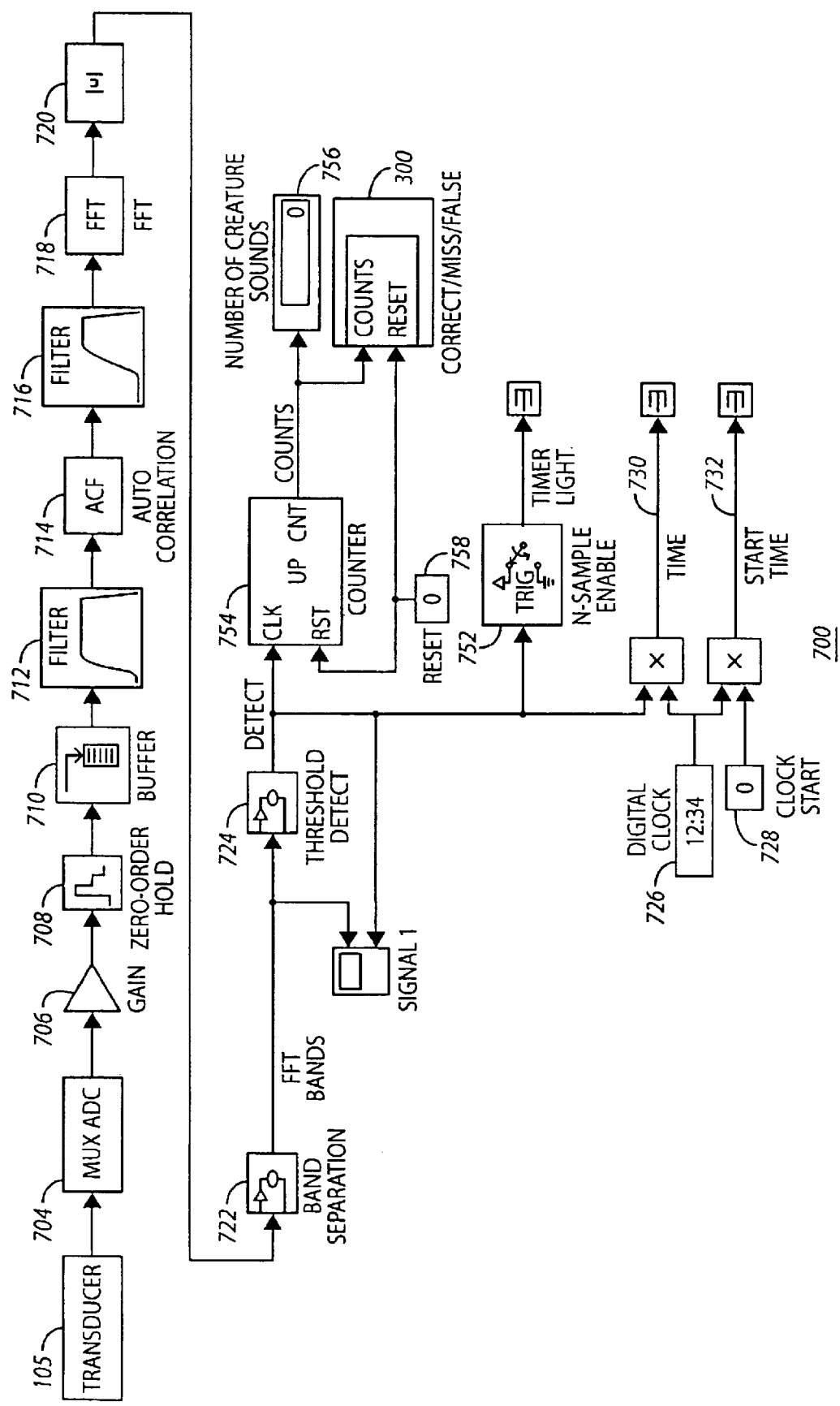
FIG. 7 is a schematic diagram of yet another exemplary data acquisition and processing system in accordance with the present invention.

FIG. 7 depicts a block diagram of yet another exemplary data acquisition and processing system (system) 700 that can be used to identify a vibrational wave which is indicative of the presence of one or more specific types of creatures. Again, the system 700 can be realized in hardware, software, or a combination of hardware and software. For example, the system 700 can include one or more processors which execute program code and process data. Such a processor can be a central processing unit (CPU), a digital signal processor (DSP), an application specific integrated circuit (ASIC) or any other suitable processor.

The system 700 can include an analog-to-digital converter (A/D) 704 which can receive a signal from the transducer 105 and convert the signal to digital format. The signal then can be amplified by amplifier 706, sampled by digital sampler 708, and stored into a buffer 710. For example, the digital sampling rate can be 44.1 kHz and the buffer length can be 512 bytes. The signal then can be filtered by a filter 712. An auto correlation processor 714 then can autocorrelate the signal to reduce any non-periodic signals. Another filter 716 can be then used to reduce any low frequency content from the autocorrelated signal. The signal then can be processed by a Fast Fourier Transform (FFT) processor 718 to generate FFT data from the signal so that the frequency content of the signal can be analyzed. A processor 720 can be provided to represent the complex numbers of the FFT data with signal magnitudes and phase angles.

A band separation sub-system 722 (discussed below) can be used to analyze the magnitude of the frequency content in three separate ranges, for example 2–4 kHz, 4–6 kHz and 6–8 kHz. The threshold detector 724 (shown in FIG. 13 and also discussed below) then can use three different checks to determine if a vibrational wave associated with a particular creature is detected.

An N-sample enable trigger 752 can be used to trigger an alarm, for example an indicator, to alert that a specified creature disposed in water is present. The indicator can stay activated for a period of time. Further, counter 754 can be used to count the number of signals received that are indicative of a presence of the specified creature. The count can be displayed in a register 756. Reset switch 758 can be activated by a user to reset the counter 754 and set the register 756 to zero. Further, the number of correct identifications and false identifications can be tracked with an error tracking system 300, as described above for FIG. 3. Finally, a digital clock 726, clock start 728, time 730 and start time 732 can be used to compute a time at which creatures are detected.

Figure 8:
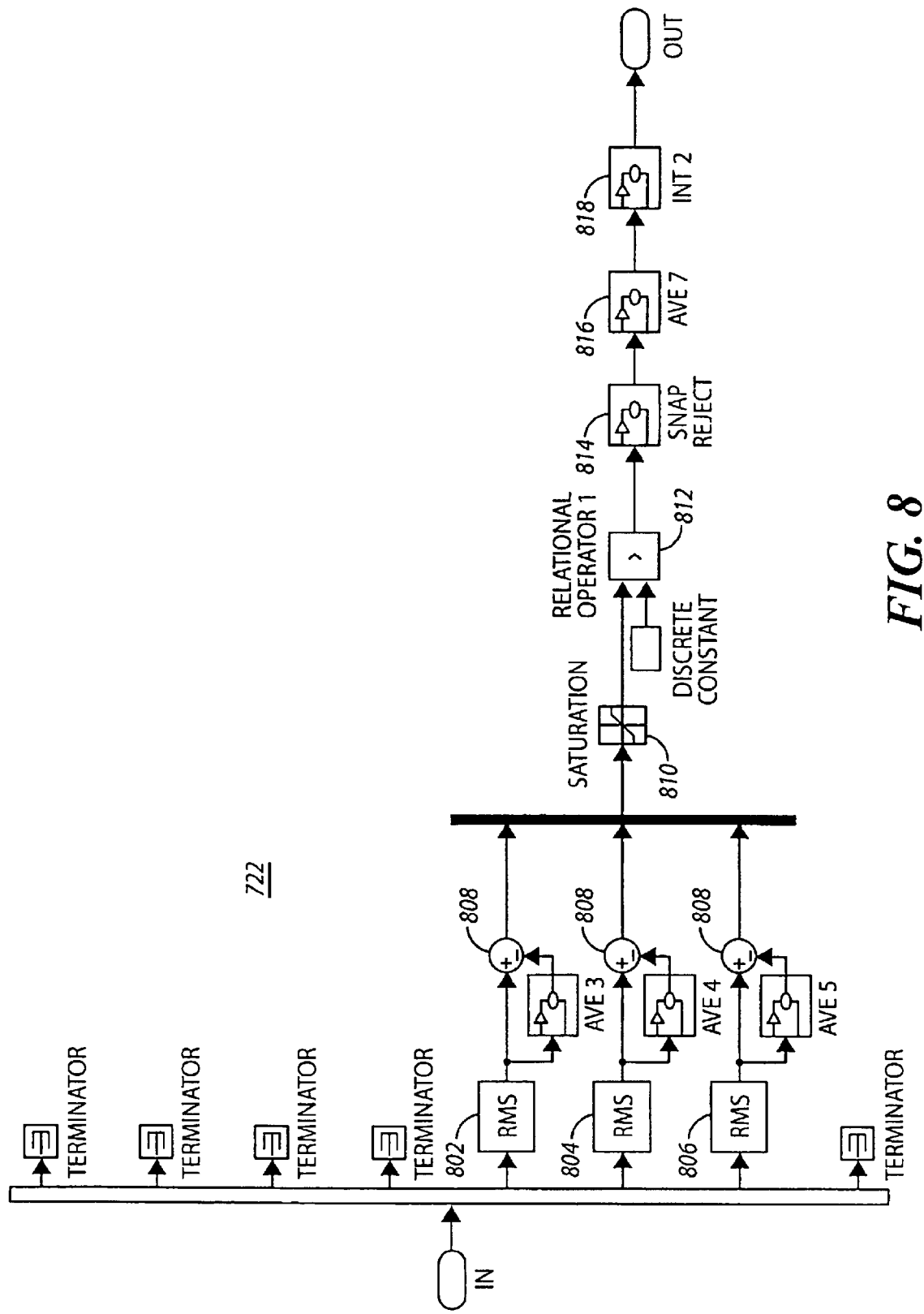
FIG. 8 is a schematic diagram of an exemplary band separation subsystem in accordance with the present invention.

Referring to FIG. 8, an exemplary band separation subsystem 722 is shown. A signal can be divided into a plurality of signals having a narrower bandwidth. For instance, the signal can be divided into eight bands. The first four bands need not be used because they are mirrored in the last four bands. (Band 1=Band 8; Band 2=Band 7; Band 3=Band 6; Band 4=Band 5) Further, band 8 is not used because no important data is contained in that frequency range. Accordingly, three bands can remain for analysis. The root-mean-square (RMS) value of the three bands can be determined using RMS detectors 802, 804, 806 and a moving average can be subtracted from the current value using adders 808 to eliminate sustained sounds. A saturation function 810 can be applied to set the minimum of this signal to zero. Any sample that does not exceed a reference value can be set to zero using a relational operator 812.

The snap reject module 814 (detailed below and shown in FIG. 9) can be used to eliminate any sounds that do not exceed a specified time length, for example the snapping of shrimp. The moving average then can be taken and a moving integral can be used to create a smooth signal. In operation, a current signal can be compared against several of its predecessors, as previously discussed for the delay subsystem of method 2. If a majority of samples represent a creature detection, a value representing an affirmative creature detection is passed back to the Band Separation subsystem.

Figure 9:
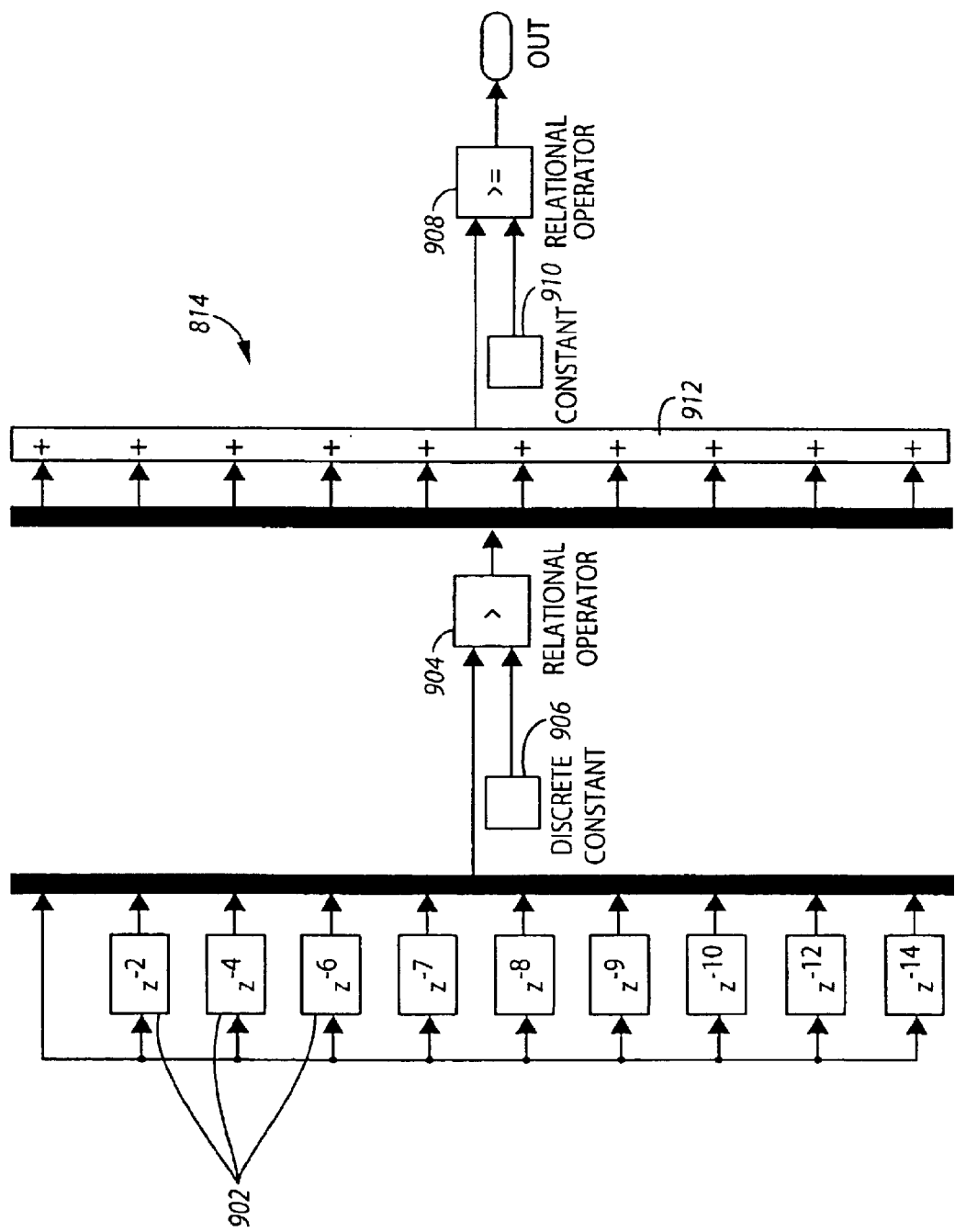
FIG. 9 is a schematic diagram of an exemplary snap reject module in accordance with the present invention.

Referring to FIG. 9, an exemplary snap reject module 814 is shown. The snap reject module 814 can include a plurality of delay processors 902. Each delay processor 902 can be used to pass a portion of a detected signal, each portion correlating to a discrete time. For example, a first delay processor can pass the detected signal for a first period of time, the second delay processor can pass the detected signal for a second period of time, and so on. Signals output by the delay processors then can be compared to a discrete constant 906 by relational operator 904 to insure that the amplitude of the detected signals is above a predetermined threshold. Accordingly, the relational operator 904 can output a vector which represents the duration of the detected signal. For example, if ten delay processors 902 are used, the vector can comprise ten discrete values. The vector values then can be summed using summing block 912. The sum of the vectors can represent the total duration of the detected signal. The sum can be forwarded to a relational operator 908, which can evaluate the sum against a constant 910. For instance, if there are ten vectors having values of zero or one, a value of nine can be used for the constant. The relational operator 908 can output a signal which indicates whether the sum is greater than the constant. For example, if the signal is greater than the constant, the relational operator 908 can output a signal indicating that the detected signal has sufficient duration to potentially be a vibrational wave associated with a specified creature.

Figure 10:
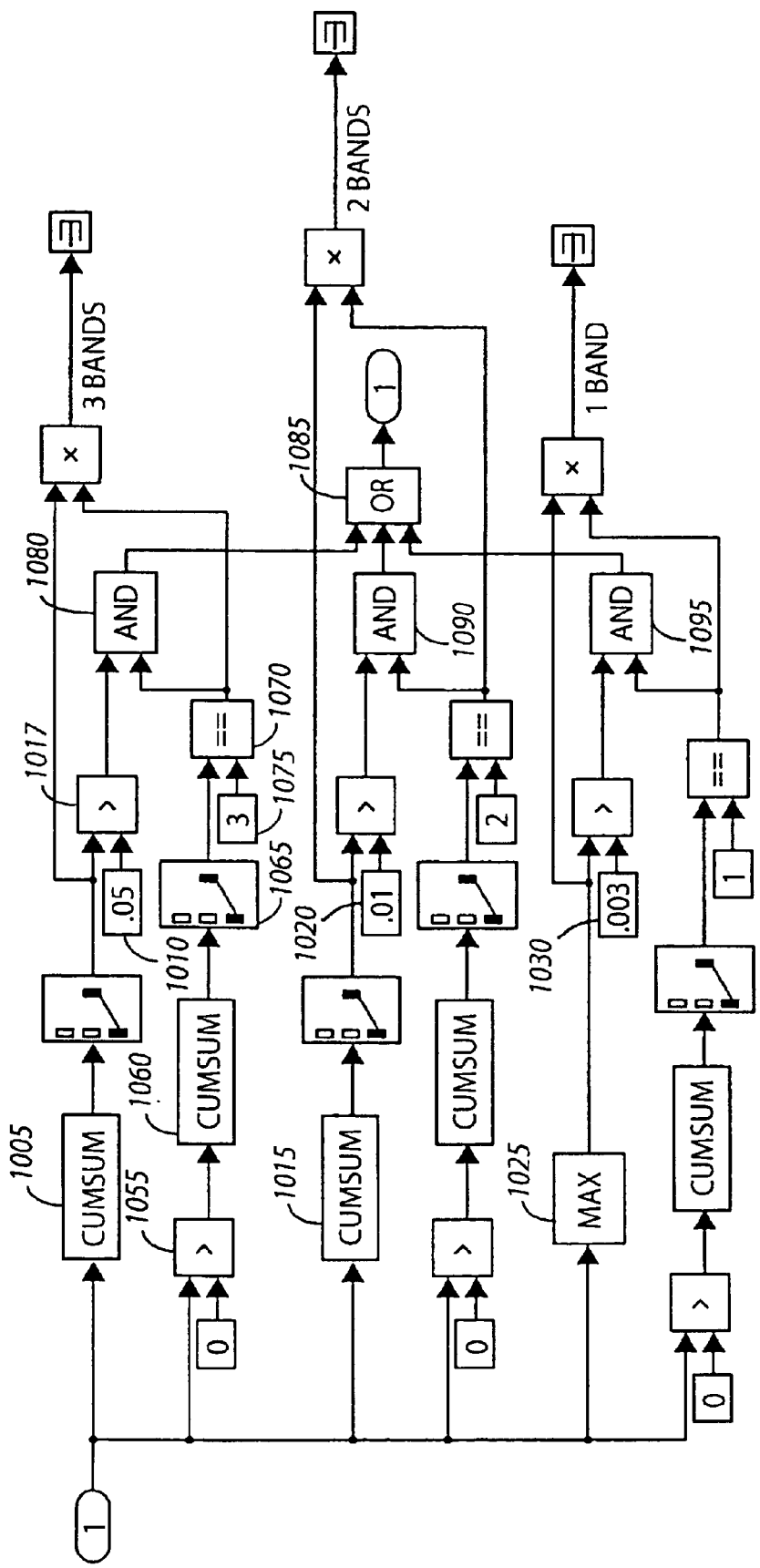
FIG. 10 is a schematic diagram of an exemplary threshold detector in accordance with the present invention.

The threshold detector 724 of FIG. 10 can provide a plurality of different methods for detecting a creature signal. First, for example, if sound is detected in three frequency bands (top two signal paths), the amplitudes of the three signals can be summed using an adder 1005. The sum of the signals can be evaluated against a user adjustable threshold 1010 by a relational operator 1017. Further, relational operator 1055, adder 1060, selector 1065, and relational operator 1070 can determine whether the desired number bands are detected. For example, the selector 1065 can output a vector, the last value of which represents the total number of detected frequency bands. The relational operator 1070 can evaluate the last value of the vector against a constant 1075, which in this case can be three. If the output of the relational operators 1017 and 1070 indicate that the correct number of frequency bands are detected and that the signal amplitude is above the threshold level 1010, then relational operator 1080 can output a signal representing a potential creature detection to relational operator 1085.

Second, if sound is detected in two of the frequency bands, for example, (middle two signal paths), the amplitudes can be summed using adder 1015, and the sum of the signal amplitudes can be evaluated against another user adjustable threshold 1020. The number of frequency bands detected can be evaluated, as described above. If the sum of the amplitudes is above the threshold value 1020 and the correct number of frequency bands are detected, relational operator 1090 can output a signal representing a potential creature detection to the relational operator 1085.

If, for example, sound is detected in only one of the frequency bands (bottom two signal paths), the maximum signal amplitude can be identified using a max detector 1025 the maximum signal amplitude can be evaluated against yet another user adjustable threshold 1030. Again, the number of frequency bands containing the signal can be determined. A relational operator 1095 can output a signal to relational operator 1085 representing a potential creature detection if the amplitude of the detected signal is above the threshold 1030 and the correct number of frequency bands is detected. The relational operator 1085 can output a signal to the main system representing a potential creature detection of the relational operator receives such a signal from any of the relational operators 1080, 1090, 1095. Although the exemplary system described herein detects up to three frequency bands, the present invention is not so limited. For example, the present invention can detect and evaluate any number of frequency bands.

User Interface

Figure 11:
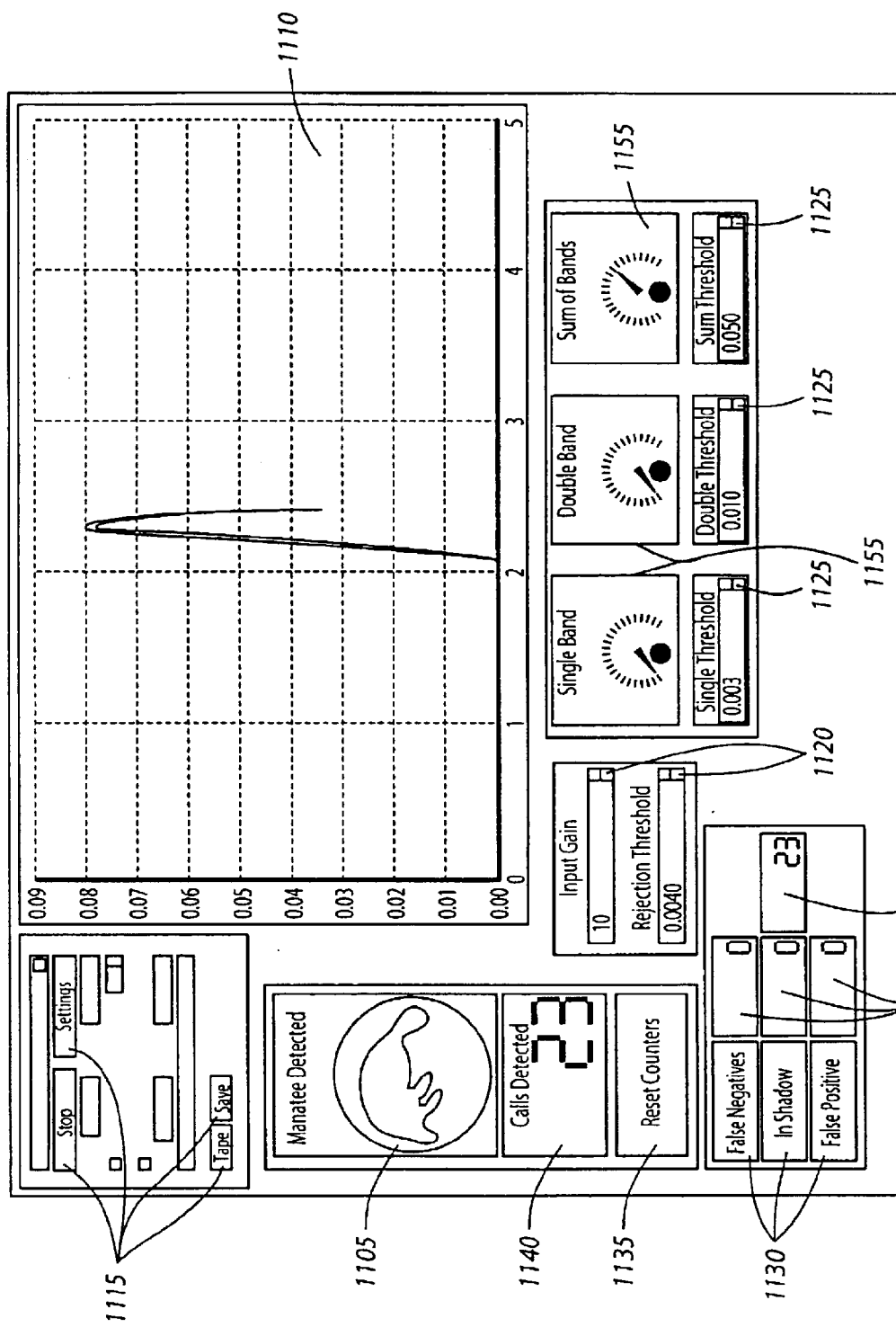
FIG. 11 is an exemplary warning system user interface in accordance with the present invention.

FIG. 11 depicts an exemplary user interface 1100 which can be provided with the warning system. The user interface can receive user inputs and display useful system and detection information. For example, the user interface can include a creature detection indicator 1105, a sound detection display 1110, other visual indicators and user controls. User controls 1115 can be provided for file operations and user controls 1120 can be provided for input gain and rejection threshold settings.

Additionally, user controls 1125 can be provided for adjusting the threshold detection values (as described for FIG. 10), for instance a single threshold, a double threshold and a sum threshold control can be provided. Further, user controls 1130 can be provided for receiving user inputs identifying false negative shadows, false shadows and false positives, and reset control 1135 can be provided for resetting counters. Still, a myriad of other user controls can be provided and the invention is not limited to the examples described herein.

A wide variety of visual indicators can be provided to provide users with creature detection and system operation information. For example, an indicator 1140 can be provided which identifies a number of creatures detected by the system and indicators 1145 can be provided to display the number of false negative shadows, false shadows and false positives identified. A correct count indicator 1150 can be provided to identify the total number of correct creature detections. Further, detection level indicators 1155 can be provided to display the strength of detected signals (again, as described for FIG. 10).

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for identifying a presence of a creature disposed in a body of writer comprising:
    a passive transducer for receiving at least one vibrational wave emanating from said creature and generating at least one transformed signal responsive to said vibrational wave;
    a signal processor for processing said transformed signal to indicate a presence of a particular type of creature which is disposed in the body of water; and
    an indicator which communicates at least one warning signal responsive to a detection of said creature, wherein said indicator is mounted above a water line of a structure secured to the bottom of the body of water.

2. The system of claim 1, wherein said indicator is selected from the group consisting of a visual indicator, an audio transducer, and a mechanical vibration device.

3. The system of claim 1, wherein said signal processor comprises at least one counter, said counter measuring a number of creature detection occurrences.

4. The system of claim 1, wherein said signal processor comprises at least one counter, said counter measuring a number of false creature identification occurrences.

5. The system of claim 1, further comprising a snap rejection module, said snap rejection module rejecting vibrational waves having a duration less than a predetermined value.

6. The system of claim 1, wherein said signal processor detects a harmonic frequency content of said signal.

7. The system of claim 6, said signal processor measures an amplitude of at least one harmonic frequency.

8. The system of claim 6, wherein said signal processor detects a maximum harmonic freqiency.

9. The system of claim 1, wherein the creature is a manatee.

10. The system of claim 1, wherein the structure is a buoy.

11. The system of claim 1, wherein the structure is a sign pole.

12. A system for identifying a presence of a creature disposed in water comprising:

a transducer for receiving at least one vibrational wave and generating at least one transformed signal responsive to said vibrational wave;

a signal processor for processing said transformed signal to indicate a presence of a particular type of creature which is disposed in water; and an indicator which communicates at least one warning signal responsive to a detection of said creature, wherein said indicator is a mechanical device operatively connected to a control system of a watercraft.

13. A method for identifying a presence of a creature disposed in water comprising the steps of:

receiving at least one vibrational wave and generating at least one transformed signal responsive to said vibrational wave;

processing said transformed signal to indicate a presence of a particular type of creature which is disposed in water; and automatically controlling at least one operational parameter of a watercraft responsive to an indication of a presence of the creature.

14. The method according to claim 13, further comprising the step of measuring a number of indications of a presence of the creature.

15. The method according to claim 13, further comprising the step of measuring a number of false indications of a presence of the creature.

16. The method according to claim 13, wherein said processing step further comprises the step of rejecting signals associated with vibrational waves having a duration less than predetermined value.

17. The method according to claim 13, wherein said receiving at least one vibrational wave comprises receiving a sound created by at least one of a vocalization, a translational movement in water, a slapping of water and a clicking.

18. The method according to claim 13, wherein said processing step further comprises the step of detecting a harmonic frequency content of the signal.

19. The method according to claim 13, wherein said processing step further comprises the step of measuring an amplitude of at least one harmonic frequency.

20. The method according to claim 13, wherein said processing step further comprises the step of detecting a maximum harmonic frequency.

* * * * *